July 25, 1961 T. M. DRESSLER Re. 25,012

GOVERNING MECHANISM FOR FUEL INJECTION PUMPS OF DIESEL ENGINES

Original Filed Sept. 19, 1956 3 Sheets-Sheet 1

INVENTOR.
Thomas M. Dressler
BY Paul O. Pippel
Atty.

July 25, 1961 T. M. DRESSLER Re. 25,012

GOVERNING MECHANISM FOR FUEL INJECTION PUMPS OF DIESEL ENGINES

Original Filed Sept. 19, 1956 3 Sheets-Sheet 2

INVENTOR.
Thomas M. Dressler
BY Paul O. Pippel
Atty.

GOVERNING MECHANISM FOR FUEL INJECTION PUMPS OF DIESEL ENGINES

Original Filed Sept. 19, 1956 3 Sheets-Sheet 3

INVENTOR.
Thomas M. Dressler
BY Paul O. Pippel
Atty.

United States Patent Office

Re. 25,012
Reissued July 25, 1961

25,012

GOVERNING MECHANISM FOR FUEL INJECTION PUMPS OF DIESEL ENGINES

Thomas M. Dressler, Chicago, Ill., assignor to International Harvester Company, a corporation of New Jersey Original No. 2,836,162, dated May 27, 1958, Ser. No. 610,813, Sept. 19, 1956. Application for reissue Feb. 1, 1960, Ser. No. 6,088
12 Claims. (Cl. 123—140)

Matter enclosed in heavy brackets [ ] appears in the original patent but forms no part of this reissue specification; matter printed in italics indicates the additions made by reissue.

This invention relates to a governing mechanism for a fuel injection pump of a diesel engine.

An object of the invention is to provide a governing mechanism for a fuel injection pump of a diesel engine which will control the pump so that an excess of fuel will be supplied to the engine for starting thus enabling easier starting of the engine.

Another object of the invention is to provide a resilient stop mechanism for a governing mechanism for a fuel injection pump of a diesel engine.

The foregoing and other objects of the invention will be apparent from the construction and arrangement illustrated in the accompanying drawings wherein:

FIGURE 4 is a view similar to FIGURE 1 showing the governing mechanism in the position after the engine is subjected to a still greater overload.

Figure 1:
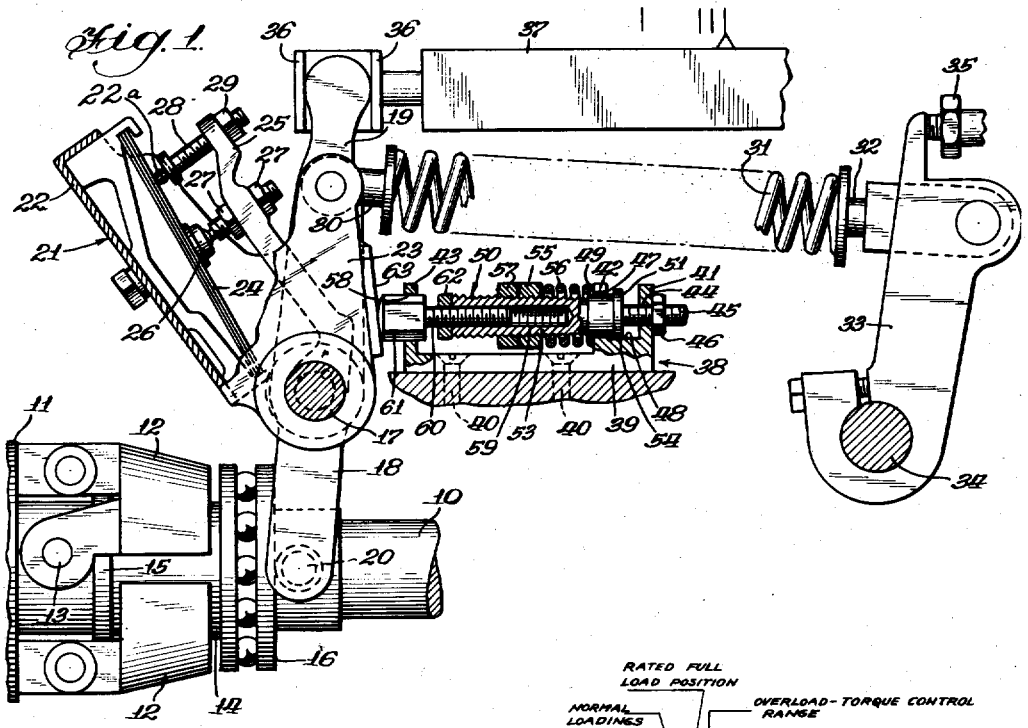
FIGURE 1 is a view showing a governing mechanism for a fuel injection pump of a diesel engine with the governing mechanism being in the position when the engine is not running.

In the past it has been found that diesel engines are difficult to start. The invention proposes a governing mechanism for a fuel injection pump of a diesel engine which will control the fuel injection pump so that the pump will supply an excess of fuel for starting the engine. With this excess of fuel the engine will be easy to start. The governing mechanism is comprised of opposed weights pivotally mounted on a shaft operatively connected to the engine crankshaft. Another shaft is disposed transversely of and above the first named shaft. A member is fixedly secured on the second named shaft intermediate its ends and another member is fixedly secured on the shaft at an angle from the first named member. A V-shaped member made up of a pair of arms is pivotally mounted on the second named shaft and one of the arms carries resilient means engageable with the second named member. Another resilient means is pivotally connected to the other arm of the third named member and is also pivotally connected to the engine. A resilient stop mechanism is mounted on the engine and is engageable with said other arm of the third named member. The first named member is connected to a control rack which is operatively connected to the fuel injection pump of the engine.

The apparatus shown in the drawings is mounted in the casing of a fuel injection pump. A horizontally disposed rotating shaft 10 is driven from the engine crankshaft by suitable gearing and a carrier 11 is fixedly mounted on and rotates with the shaft. A pair of opposed weights 12 are pivotally mounted on the shaft 10 and are provided with thrust portions 13. A sleeve 14 is slidably mounted on the shaft 10 and has a collar 15 extending therearound and integral therewith. A ball bearing assembly 16 is slidably mounted on the shaft 10 adjacent the sleeve 14. A horizontally disposed shaft 17 is arranged transversely of and spaced above the shaft 10 and a member is fixedly secured on the shaft 17 intermediate its ends and the member has a pair of arms 18 arranged in spaced parallel relation and a third arm 19 extending longitudinally away from the pair of arms. The pair of arms 18 are disposed on opposite sides of the shaft 10 and are pivotally connected to the ball bearing assembly 16 as at 20. A V-shaped member 21 is made up of a pair of arms 22 and 23 and the member is pivotally mounted on the shaft 17 at the location of the intersection of the arms. Resilient means in the form of a plurality of leaf springs 24 are carried by the arm 22. The arm 22 is made up of a frame and a spring holder disposed in the frame and a screw secures the spring holdler to the frame. The spring holder has a hook at one extremity and a projecting portion at its other extremity and adjacent ends of the leaf springs 24 are disposed under the hook and the other ends of the leaf springs are disposed against the projecting portion and both ends of the leaf springs bear against the spring holder. A pin 22a is arranged transversely of the arm 22 and is removably mounted in the arm. A member 25 is fixedly secured on the shaft 17 and is disposed on the shaft at an angle with respect to the longitudinal axis of the member having arms 18 and 19. A projection 26 is secured to the member 25 intermediate the ends thereof. The projection 26 is made up of an externally threaded element in engagement with a threaded opening in the member 25 and lock nuts 27 are threaded on the element on opposite faces of the member and a cap is universally jointed on the threaded element. The projection 26 engages the leaf springs 24 to bend them under certain engine conditions as will be discussed below. A screw 28 is disposed at the free end of the member 25 and is in engagement with a threaded opening in the member and a lock nut 29 is threaded on the screw and bears against the member. A link 30 is pivotally connected to the free end of arm 23 of member 21 and is connected to one end of a resilient means in the form of a coil spring 31 and the other end of the spring is connected to a link 32 which is in turn pivotally connected to a speed adjusting arm 33. The arm 33 is mounted on a transverse shaft 34 and an adjustable stop 35 limits the maximum speed position of the arm 33 while permitting movement in the other direction to reduce the speed of the engine. The arm 19 is located between thrust flanges 36 of a member or control rack 37. The rack 37 is adapted to control the quantity of fuel injected by changing the angular position of the injection plunger of the fuel injection pump. A fuel injection pump with the control rack operatively connected to it is shown in the patent to Buck, Barbknecht and Bowers No. 2,507,689. A stop mechanism is generally designated 38 and is comprised of a support 39 mounted on the engine by means of screws 40. The support 39 has three spaced parallel plates 41, 42 and 43 integral therewith. The plate 41 is provided with a threaded opening 44 and an externally threaded element 45 is in threaded engagement with the opening and a lock nut 46 is disposed on the element and bears against the outer face of the plate. The plate 42 is provided with a notch and this notch is made up a circular opening 47 nearly flush with the surface 48 of the support 39 and a slot 49 extending inwardly from the upper edge of the plate and merging with the circular opening. The circular opening 47 has a diameter greater than the width of the slot 49. A screw 50 has a head 51 and a large shank section 52 and a small shank section 53 and a segment of the head is cut away flush with the large shank section to provide a flat edge 54. The diameter of the large shank section is slightly smaller than the diameter of the circular opening 47 but larger than the width of the slot 49 so that the screw must be inserted into the support 39 with the small shank section 53 first passing through the slot and then into the opening and then moving the large shank section into the opening. There is enough clearance between the circular opening 47 and the large shank section 52 to sidably dispose the screw 50 in the plate 42. The head 51 of the screw 50 is disposed between the plates 41 and 42 and the flat edge 54 of the screw engages the surface 48 of the support so that the screw cannot be rotated after it is disposed in the opening 47. A nut 55 is threaded on the screw 50 and a resilient means or coil spring 56 is disposed on the screw between the nut and the plate 42 and a lock nut 57 is threaded on the screw and bears against the nut. The plate 43 is provided with a circular opening 58 and the screw 50 is provided with a threaded opening 59 extending inwardly from the free end of the screw and a screw 60 is threaded into the opening 59 and has a hexagonal head 61 slidably disposed in the opening 58 in the plate. A lock nut 62 is threaded on the screw 60 and bears against the screw 50. The small pointer on the top of the control rack 37 and the vertical marks thereabove have been added to the drawings to illustrate the function of applicant's device. The marks have been labeled in FIGURE 4 as "Idle position," "Normal loadings," "Rated full load position," "Overload-torque control range," and "Starting-excess fuel range."

Figure 2:
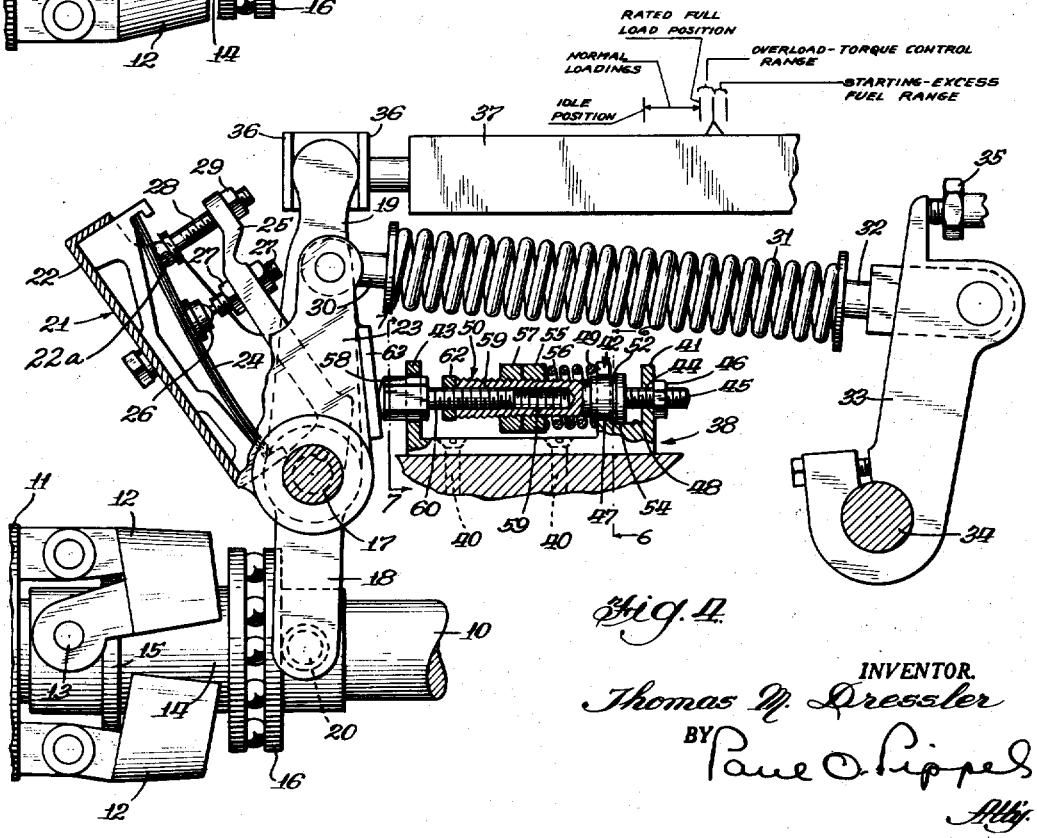
FIGURE 2 is a view similar to FIGURE 1 showing the governing mechanism in the position after the engine has been started and has reached idling position.
Figure 2:
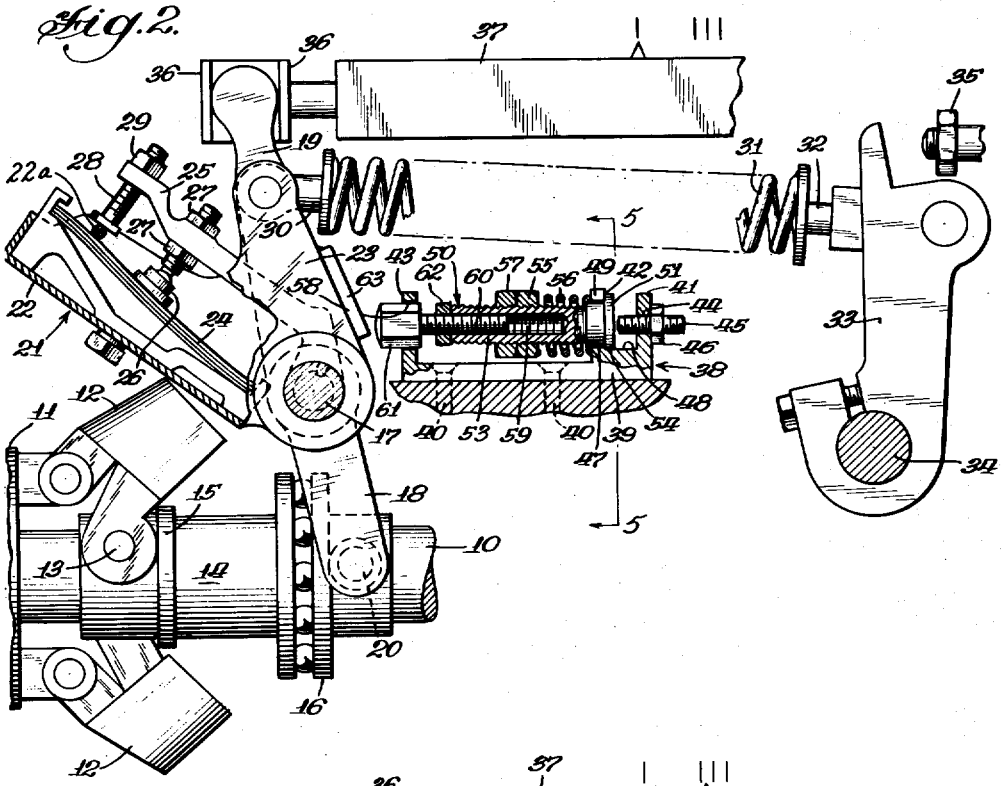
Figure 3:
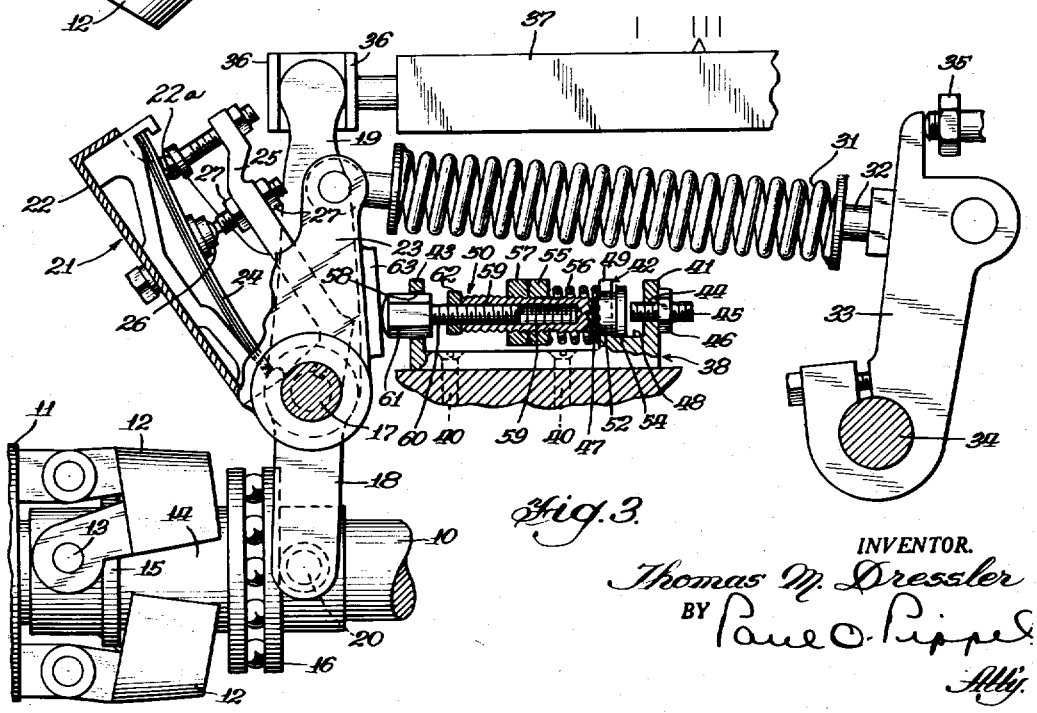
FIGURE 3 is a view similar to FIGURE 1 showing the governing mechanism in the position after the engine is subjected to an overload.
Figure 5:
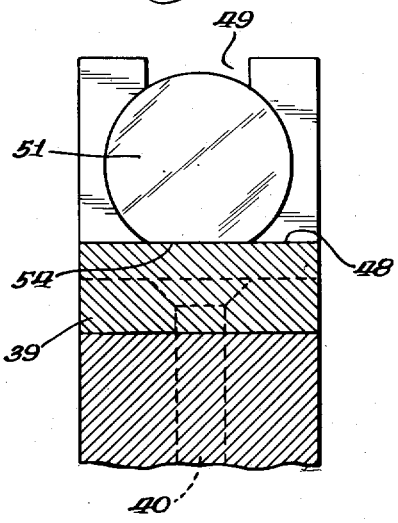
FIGURE 5 is a view taken on the line 5—5 of FIGURE 2.
Figure 6:
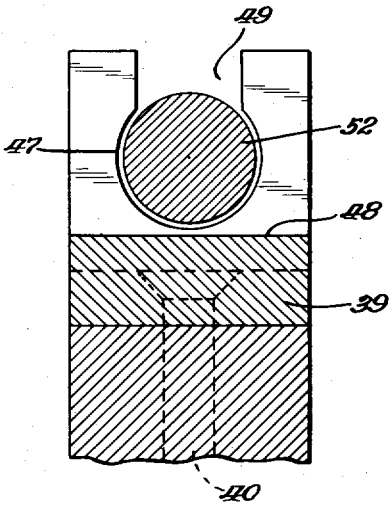
FIGURE 6 is a sectional view taken on the line 6—6 of FIGURE 4.
Figure 7:
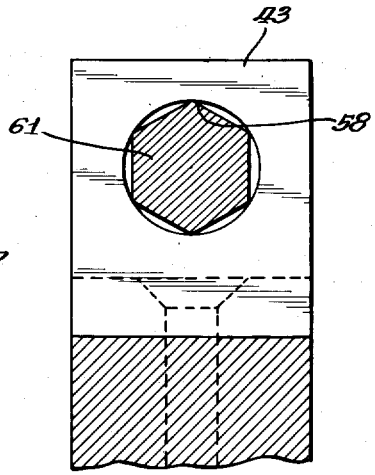
FIGURE 7 is a view taken on the line 7—7 of FIGURE 4.

The mode of operation of the invention is as follows: In FIGURE 1 governing mechanism is shown in the position when the engine is not running. In this position the weights 12 are disposed inwardly and the stop 63 on member 21 is bearing against the head of the screw 60 compressing the coil spring 56 so that the head of screw 50 is spaced from plate 42 and is in engagement with the element 45. The coil spring 31 is under a considerable tension as shown by the separation of the coils of the spring while the leaf springs 24 are straight. It will be noted that the pointer on the control rack 37 is at the mark on the far right of the scale so that the fuel injection pump is in the excess fuel range so as to give a thirty percent fuel excess or more for starting the engine. In FIGURE 2 the governing mechanism is shown in the position after the engine has been started and has reached idling position as shown by the pointer on the control rack 37. In this position the shaft 10 is rotating and the weights 12 are thrown outwardly by centrifugal force resulting in the movement of sleeve 14 to the right and the sleeve moves ball bearing assembly 16 to the right causing the member attached to the assembly and shaft 17 to be moved counterclockwise about the axis of shaft 17. Since the member 25 moves with shaft 17 the projection 26 engages the leaf springs 24 causing counterclockwise movement of the member 21 and finally bending of the leaf springs. The counterclockwise movement of the member 21 causes the coil spring 31 to be placed under a slight tension. As the member 21 moves counterclockwise the stop 63 moves out of engagement with the head of the screw 60 so that coil spring 56 causes screws 50 and 60 to be moved to the left until the head of screw 50 engages plate 42 and the head of screw 50 moves out of engagement with the element 45. The movements of the weights 12 and the member having arms 18 and 19 and members 21 and 25 and springs 24 and 31 causes the control rack 37 to be moved to the left to idling position causing rotation of the plunger of the fuel injection pump so that a lesser quantity of fuel is injected than when starting the engine. In FIGURE 3 the governing mechanism is shown in the position after an overload has been put on the engine. The overload on the engine results in a decrease in the rate of rotation of the shaft 10 and the weights 12 move inwardly toward the shaft. The position of the weights 12 allows the coil spring 31 to move member 21 clockwise which in turn moves member 25 and shaft 17 and the member having arms 18 clockwise and ball bearing assembly 16 and sleeve 14 are moved to the left on shaft 10. The member 21 moves clockwise until stop 63 engages the head of screw 60 and screws 50 and 60 are moved to the right against the force of the coil spring 56 so that the head of screw 50 is spaced from plate 42. The leaf springs 24 remain bent. The coil spring 31 and member 21 and stop mechanism 38 and leaf springs 24 and member 25 and weights 12 cause the member having arms 18 and 19 to be moved clockwise so that the control rack 37 is moved to the right resulting in the rotation of the plunger in the fuel injection pump and causing a greater quantity of fuel to be injected for the overload shown in FIGURE 3. In FIGURE 4 the governing mechanism is shown with a still greater overload on the engine than in FIGURE 3. Since the overload on the engine is greater the rate of rotation of the shaft 10 is decreased so that the weights 12 move farther inwardly toward the shaft. The position of the weights 12 allows the coil spring 31 to move member 21 and leaf springs 24 clockwise which in turn moves member 25 and shaft 27 and the member having arms 18 clockwise and ball bearing assembly 16 and sleeve 14 are moved to the left on shaft 10. The member 21 moves clockwise until the head of screw 50 engages the element 45. The leaf springs 24 remain bent. The coil spring 31 and member 21 and stop mechanism 38 and leaf springs 24 and member 25 and weights 12 cause the member having arms 18 and 19 to be moved clockwise so that the control rack 37 is moved to the right until its pointer is at the right mark of the overload range resulting in rotation of the plunger in the fuel injection pump and causing a greater quantity of fuel to be injected for the overload shown in FIGURE 4. Since the element 45 is threaded it may be moved longitudinally of the plate 41 allowing adjustment. Since the screw 50 has nut 55 threaded thereon compression of the coil spring 56 may be adjusted by turning the nut. The combined length of the screws 50 and 60 may be adjusted by turning the screw 60. Thus it will be seen that the stop mechanism has very fine adjustment so that it may be adjusted for the desired conditions.

What is claimed is:

1. In a governing mechanism for a diesel engine, a first rotating shaft, a sleeve slidably mounted on the shaft, a pair of opposed weights pivotally mounted on the first shaft, a second shaft arranged transversely of and spaced above the first shaft, a member fixedly secured on the second shaft and pivotally connected to the sleeve, a member pivotally mounted on the second shaft, resilient means carried by the second named member, a member fixedly secured on the second shaft, resilient means pivotally mounted on the second named member and pivotally mounted in the engine, a member pivotally connected to the first named member and operatively connected to a fuel injection pump, and a resilient stop mechanism mounted on the engine and engaging the second named member when the engine is not running and the third named member compressing the first named resilient means after the engine is started and the second named resilient means being under tension when the engine is not running and after the engine is started.

2. In a governing mechanism for a diesel engine, a first rotating shaft, a sleeve slidably mounted on the shaft, a pair of opposed weights pivotally mounted on the first shaft, a second shaft arranged transversely of and spaced above the first shaft, a member fixedly secured on the second shaft intermediate its ends and having one end pivotally connected to the sleeve, a member pivotally mounted on the second shaft, resilient means carried by the second named member, a member fixedly secured on the second shaft, resilient means having one end pivotally mounted on the second named member and having its other end pivotally mounted on the engine, a member having one end pivotally connected to the other end of the first named member and operatively connected to a fuel injection pump, and a resilient stop mechanism mounted on the engine and engaging the second named member when the engine is not running and the third named member compressing the first named resilient means after the engine is started and the second named resilient means being under tension when the engine is not running and after the engine is started.

3. In a governing mechanism for a diesel engine, a shaft, a sleeve slidably mounted on the shaft, a pair of opposed weights pivotally mounted on the shaft, a second shaft arranged transversely of and spaced above the first shaft, a member fixedly secured on the second shaft intermediate its ends and having one end pivotally connected to the sleeve, a V-shaped member made up of a pair of arms and the member being pivotally mounted on the second shaft at the location of the intersection of the arms, resilient means carried by one of the pair of arms of the V-shaped member, a member fixedly secured on the second shaft, resilient means having one end pivotally mounted on the free end of the other of the arms of the V-shaped member and having its other end pivotally mounted on the engine, a member having one end pivotally connected to the other end of the first named member and operatively connected to a fuel injection pump, and a resilient stop mechanism mounted on the engine and engaging said other of the arms of the second named member when the engine is not running and when the engine is overloaded and the third named member compressing the first named resilient means after the engine is started and when the engine is overloaded and the second named resilient means being under tension when the engine is not running and after the engine is started and when the engine is overloaded.

4. In a governing mechanism for a diesel engine, a shaft, a sleeve slidably mounted on the shaft, a pair of opposed weights pivotally mounted on the shaft, a second shaft arranged transversely of and spaced above the first shaft, a member having three arms with a pair of the arms being arranged in opposed relation and the third arm extending longitudinally away from the pair of arms and the member being fixedly secured on the second shaft intermediate its ends and the pair of arms being disposed on opposite sides of the first shaft and pivotally connected to the sleeve, a V-shaped member made up of a pair of arms and the member being pivotally mounted on the second shaft at the location of the intersection of the arms, resilient means carried by one of the pair of arms of the V-shaped member, a member fixedly secured on the second shaft, resilient means having one end pivotally mounted on the free end of the other of the arms of the V-shaped member and having its other end pivotally mounted on the engine, a member having one end pivotally connected to the free end of the third arm of the first named member and operatively connected to a fuel injection pump, and a resilient stop mechanism mounted on the engine and engaging said other of the arms of the second named member when the engine is not running and when the engine is overloaded and the third named member compressing the first named resilient means after the engine is started and when the engine is overloaded and the second named resilient means being under tension when the engine is not running and after the engine is started and when the engine is overloaded.

5. In a governing mechanism for a diesel engine, a first shaft, a sleeve slidably mounted on the first shaft, a pair of opposed weights pivotally mounted on the first shaft, a second shaft arranged transversely of and spaced above the first shaft, a member having three arms with a pair of the arms being arranged in opposed relation and the third arm extending longitudinally away from the pair of arms and the member being fixedly secured on the second shaft intermediate its ends and the pair of arms being disposed on opposite sides of the first shaft and pivotally connected to the sleeve, a V-shaped member made up of a pair of arms and the member being pivotally mounted on the second shaft at the location of the intersection of the arms, a leaf spring carried by one of the pair of arms of the V-shaped member, a member fixedly secured on the second shaft, a projection on the third named member, a coil spring having one end pivotally mounted on the free end of the other of the arms of the V-shaped member and having its other end pivotally mounted on the engine, a member having one end pivotally connected to the free end of the third arm of the first named member and operatively connected to a fuel injection pump, and a resilient stop mechanism mounted on the engine and engaging said other of the arms of the second named member when the engine is not running and when the engine is overloaded and the projection compressing the leaf spring after the engine is started and when the engine is overloaded and the coil spring being under tension when the engine is not running and after the engine is started and when the engine is overloaded.

6. In a governing mechanism for a diesel engine, means operatively connected to the engine crankshaft and operatively connected to a fuel injection pump for controlling the quantity of fuel the fuel injection pump delivers to the engine cylinders including a movable member and a stop mechanism, the stop mechanism comprising a support mounted on the engine having three spaced parallel plates and the intermediate one of the plates being provided with an opening and one of the outer plates being provided with an opening and a member slidably disposed in the openings in said intermediate one of the plates and said one of the outer plates and having a head disposed between and engaging said intermediate one of the plates and the other of the outer plates and holding means mounted on the member and resilient means disposed between and engaging the holding means and said intermediate one of the plates, the member of the first named means contacting the member of the stop mechanism during certain speeds of the engine crankshaft to change the quantity of fuel delivered by the fuel injection pump with the latter member opposing and regulating the change in the quantity of fuel delivered by the fuel injection pump.

7. In a governing mechanism for a diesel engine, means operatively connected to the engine crankshaft and operatively connected to a fuel injection pump for controlling the quantity of fuel the fuel injection pump delivers to the engine cylinders including a movable member and a stop mechanism, the stop mechanism comprising a support mounted on the engine having three spaced parallel plates and the intermediate one of the plates being provided with an opening and one of the outer plates being provided with an opening and the other of the outer plates being provided with an opening and an element longitudinally movable in the opening of said one of the outer plates and a first securing element slidably disposed in the opening in said intermediate one of the plates and having a head disposed between said intermediate one of the plates and said one of the outer plates and engaging said intermediate one of the plates and a second securing element engaging and longitudinally movable with respect to the first securing element and slidably projecting through the opening in said other of the outer plates and holding means mounted on one of the securing elements and resilient means disposed between and engaging the holding means and said intermediate one of the plates, the member contacting the second securing element of the stop mechanism during certain speeds of the engine crankshaft to change the quantity of fuel delivered by the fuel injection pump with the second securing element opposing and regulating the change in the quantity of fuel delivered by the fuel injection pump.

8. In a governing mechanism for a diesel engine, means operatively connected to the engine crankshaft and operatively connected to a fuel injection pump for controlling the quantity of fuel the fuel injection pump delivers to the engine cylinders including a movable member and a stop mechanism, the stop mechanism comprising a support mounted on the engine having three spaced parallel plates and the intermediate one of the plates being provided with an opening and one of the outer plates being provided with a threaded opening and the other of the outer plates being provided with a circular opening and an externally threaded element disposed in the threaded opening of said one of the outer plates and a first screw slidably disposed in the opening in said intermediate one of the plates and having its head disposed between said intermediate one of the plates and said one of the outer plates and engaging said intermediate one of the plates and provided with an opening extending inwardly from its free end and a nut disposed on the first screw and a coil spring disposed on the first screw between and engaging the nut and said intermediate one of the plates and a second screw in threaded engagement with the opening in the first screw and having a head slidably projecting through the opening in said other of the outer plates, the member contacting the second screw of the stop mechanism during certain speeds of the engine crankshaft to change the quantity of fuel delivered by the fuel injection pump with the second screw opposing and regulating the change in the quantity of fuel delivered by the fuel injection pump.

9. In a governing mechanism for a diesel engine, means operatively connected to the engine crankshaft and operatively connected to a fuel injection pump for controlling the quantity of fuel the fuel injection pump delivers to the engine cylinders including a movable member and a stop mechanism, the stop mechanism comprising a support mounted on the engine having free spaced parallel plates and the intermediate one of the plates being provided with a notch and one of the outer plates being provided with a threaded opening and the other of the outer planes being provided with a circular opening and an externally threaded element disposed in the threaded opening of said one of the outer plates and a first lock nut on the element and a first screw slidably disposed in the notch in said intermediate one of the plates and having a head disposed between said intermediate one of the plates and said one of the outer plates and engaging said intermediate one of the plates and provided with an opening extending inwardly from its free end and a nut disposed on the first screw and a coil spring disposed on the first screw between the nut and said intermediate one of the plates and a second lock nut disposed on the first screw and engaging the nut and a second screw in threaded engagement with the opening in the first screw and having a head slidably projecting through the opening in said other of the outer plates and a third lock nut disposed on the second screw and engaging the free end of the first screw, the member contacting the second screw of the stop mechanism during certain speeds of the engine crankshaft to change the quantity of fuel delivered by the fuel injection pump with the second screw opposing and regulating the change in the quantity of fuel delivered by the fuel injection pump.

*10. In a governing mechanism for a diesel engine, means operatively connected to the engine crankshaft and operatively connected to a fuel injection pump for controlling the quantity of fuel the fuel injection pump delivers to the engine cylinders including a movable member and a stop mechanism, the stop mechanism comprising a support and a movable member held by the support and engageable therewith and having an end of adjustable extension engageable with the first named movable member, and a resilient means disposed between and engaging the movable member of the stop mechanism and the support and urging the movable member of the stop mechanism away from the support, the member of the first named means contacting the member of the stop mechanism during certain speeds of the engine crankshaft to change the quantity of fuel delivered by the fuel injection pump with the latter member opposing and regulating the change in the quantity of the fuel delivered by the fuel injection pump.*

*11. In a governing mechanism for a diesel engine, means operatively connected to the engine crankshaft and operatively connected to a fuel injection pump for controlling the quantity of fuel the fuel injection pump delivers to the engine cylinders including a movable member and a stop mechanism, the stop mechanism comprising a support and a movable member held by and engaging the support, said movable member of the stop mechanism having an end of adjustable extension engageable with the first named member and said support having adjustable extension engageable with the movable member of the stop mechanism, said movable member of the stop mechanism having holding means, and resilient means disposed between and engaging the holding means and the support and urging the movable member of the stop mechanism away from the support, the member of the first named means contacting the member of the stop mechanism during certain speeds of the engine crankshaft to change the quantity of fuel delivered by the fuel injection pump with the latter member opposing and regulating the change in the quantity of the fuel delivered by the fuel injection pump.*

*12. In a governing mechanism for a diesel engine, means operatively connected to the engine crankshaft and operatively connected to a fuel injection pump for controlling the quantity of fuel the fuel injection pump delivers to the engine cylinders including a movable member and a stop mechanism, the stop mechanism comprising a support having a pair of abutments and a movable member held by the support and engageable with the one abutment and with the other abutment, said movable member of the stop mechanism having holding means, and resilient means disposed between and engaging the holding means and one of the abutments, the member of the first named means contacting the member of the stop mechanism, during certain speeds of the engine crankshaft to change the quantity of fuel delivered by the fuel injection pump with the latter member opposing and regulating the change in the quantity of the fuel delivered by the fuel injection pump.*

References Cited in the file of this patent or the original patent

UNITED STATES PATENTS

| | | |
|---|---|---|
| 2,708,921 | Links | May 24, 1955 |
| 2,758,584 | Hogeman et al. | Aug. 14, 1956 |
| 2,767,700 | Parks | Oct. 23, 1956 |

FOREIGN PATENTS

| | | |
|---|---|---|
| 957,798 | France | Aug. 29, 1949 |